US011801665B2

(12) United States Patent
Hwang

(10) Patent No.: US 11,801,665 B2
(45) Date of Patent: Oct. 31, 2023

(54) HOT-DIP GALVANIZED STEEL SHEET HAVING EXCELLENT SURFACE APPEARANCE AND LOW-TEMPERATURE BONDING BRITTLENESS

(71) Applicant: POSCO, Pohang-si (KR)

(72) Inventor: Hyeon-Seok Hwang, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 142 days.

(21) Appl. No.: 17/297,266

(22) PCT Filed: Nov. 28, 2019

(86) PCT No.: PCT/KR2019/016526
§ 371 (c)(1),
(2) Date: May 26, 2021

(87) PCT Pub. No.: WO2020/111798
PCT Pub. Date: Jun. 4, 2020

(65) Prior Publication Data
US 2022/0024181 A1    Jan. 27, 2022

(30) Foreign Application Priority Data
Nov. 29, 2018 (KR) .................. 10-2018-0151371

(51) Int. Cl.
*B32B 15/01* (2006.01)
*C23C 2/02* (2006.01)
(Continued)

(52) U.S. Cl.
CPC .............. *B32B 15/013* (2013.01); *B21B 1/22* (2013.01); *B21B 1/227* (2013.01); *B21B 1/24* (2013.01);
(Continued)

(58) Field of Classification Search
CPC ...... B32B 15/013; B32B 15/012; B32B 15/04; B32B 15/043; B32B 15/18; B32B 7/02;
(Continued)

(56) References Cited

U.S. PATENT DOCUMENTS

2003/0012978 A1*  1/2003  Sodani ............... B24C 1/06
                                                                 148/533
2008/0206592 A1   8/2008  Kim et al.
(Continued)

FOREIGN PATENT DOCUMENTS

JP      H11246957      9/1999
JP      2003138364     5/2003
(Continued)

OTHER PUBLICATIONS

Machine Translation, Noro Hisato, JP 2003-138364 A, May 2003. (Year: 2003).*
(Continued)

*Primary Examiner* — Michael E. La Villa
(74) *Attorney, Agent, or Firm* — CANTOR COLBURN LLP

(57) ABSTRACT

Provided is a hot-dip galvanized steel sheet to be used for home appliances, vehicles, and the like, and having excellent surface appearance and low-temperature bonding brittleness. The hot-dip galvanized steel sheet includes: a base steel sheet; and a hot-dip galvanized layer formed on the base steel sheet. A surface of the base steel sheet has a centerline average roughness (Ra) of 0.3 or more, a roughness skewness (Rsk) of −1 or less, and a roughness kurtosis (Rku) of 6 or more.

6 Claims, 3 Drawing Sheets

(a)   (b)   (c)   (d)

(e)   (f)   (g)   (h)

(51) Int. Cl.

| | |
|---|---|
| *C23C 2/06* | (2006.01) |
| *C23C 2/40* | (2006.01) |
| *C21D 9/46* | (2006.01) |
| *C21D 1/26* | (2006.01) |
| *C21D 1/74* | (2006.01) |
| *C23C 2/16* | (2006.01) |
| *C23C 2/18* | (2006.01) |
| *C23C 2/26* | (2006.01) |
| *C23C 2/20* | (2006.01) |
| *B23H 1/00* | (2006.01) |
| *B21B 27/00* | (2006.01) |
| *B21B 27/02* | (2006.01) |
| *B32B 3/26* | (2006.01) |
| *B32B 3/30* | (2006.01) |
| *B32B 7/02* | (2019.01) |
| *C21D 7/04* | (2006.01) |
| *C23C 30/00* | (2006.01) |
| *B21B 1/22* | (2006.01) |
| *B21B 1/24* | (2006.01) |
| *B32B 15/04* | (2006.01) |
| *B32B 15/18* | (2006.01) |
| *B24C 1/00* | (2006.01) |
| *B23K 26/362* | (2014.01) |
| *B24C 1/08* | (2006.01) |
| *B23K 26/36* | (2014.01) |
| *B23K 26/352* | (2014.01) |
| *C23F 4/00* | (2006.01) |

(52) U.S. Cl.
CPC ............ *B21B 27/00* (2013.01); *B21B 27/005* (2013.01); *B21B 27/021* (2013.01); *B23H 1/00* (2013.01); *B23K 26/352* (2015.10); *B23K 26/36* (2013.01); *B23K 26/362* (2013.01); *B24C 1/00* (2013.01); *B24C 1/08* (2013.01); *B32B 3/26* (2013.01); *B32B 3/263* (2013.01); *B32B 3/30* (2013.01); *B32B 7/02* (2013.01); *B32B 15/012* (2013.01); *B32B 15/04* (2013.01); *B32B 15/043* (2013.01); *B32B 15/18* (2013.01); *C21D 1/26* (2013.01); *C21D 1/74* (2013.01); *C21D 7/04* (2013.01); *C21D 9/46* (2013.01); *C23C 2/02* (2013.01); *C23C 2/022* (2022.08); *C23C 2/06* (2013.01); *C23C 2/16* (2013.01); *C23C 2/18* (2013.01); *C23C 2/20* (2013.01); *C23C 2/26* (2013.01); *C23C 2/40* (2013.01); *C23C 30/00* (2013.01); *C23C 30/005* (2013.01); *C23F 4/00* (2013.01); *C21D 2241/00* (2013.01); *Y10T 428/12451* (2015.01); *Y10T 428/12472* (2015.01); *Y10T 428/12757* (2015.01); *Y10T 428/12799* (2015.01); *Y10T 428/12951* (2015.01); *Y10T 428/12972* (2015.01); *Y10T 428/12993* (2015.01)

(58) Field of Classification Search
CPC .. B32B 3/30; B32B 3/26; B32B 3/263; C23C 2/02; C23C 2/06; C23C 2/16; C23C 2/18; C23C 2/20; C23C 2/26; C23C 2/40; C23C 30/00; C23C 30/005; C23C 2/022; C21D 1/26; C21D 1/74; C21D 9/46; C21D 7/04; B21B 1/22; B21B 1/227; B21B 1/24; B21B 27/00; B21B 27/005; B21B 27/021; B23H 1/00; B24C 1/08; B24C 1/00; C23F 4/00; B23K 26/352; B23K 26/36; B23K 26/362; Y10T 428/12451; Y10T 428/12472; Y10T 428/12757; Y10T 428/12799; Y10T 428/12951; Y10T 428/12972; Y10T 428/12993

See application file for complete search history.

(56) References Cited

U.S. PATENT DOCUMENTS

| | | |
|---|---|---|
| 2010/0297465 A1 | 11/2010 | Nishihara et al. |
| 2014/0017516 A1 | 1/2014 | Lee et al. |
| 2015/0367605 A1 | 12/2015 | Morikawa et al. |
| 2018/0345339 A1 | 12/2018 | Jeon et al. |
| 2020/0071809 A1 | 3/2020 | Jeon et al. |

FOREIGN PATENT DOCUMENTS

| | | |
|---|---|---|
| JP | 2006193776 | 7/2006 |
| JP | 2008069437 | 3/2008 |
| JP | 2008525641 | 7/2008 |
| JP | 2009052080 | 3/2009 |
| JP | 2010100866 | 5/2010 |
| JP | 2012180558 | 9/2012 |
| JP | 2014506626 | 3/2014 |
| JP | 2015036426 | 2/2015 |
| KR | 100742832 | 7/2007 |
| KR | 20100072056 | 6/2010 |
| KR | 20130026131 | 3/2013 |
| KR | 101677390 | 11/2016 |
| KR | 101830549 | 2/2018 |
| WO | 2017111449 | 6/2017 |

OTHER PUBLICATIONS

EP Extended Search Report dated Dec. 10, 2021 re: Application No. PCT/KR2019/016526, pp. 1-7, citing: US 2015/367605 A1, N.N. "Standard Practice of Using . . .", JP 2015 036426 A, Jp 2009 052080 A and KR 2013 0026131 A.

N.N. "Standard Practice for Using Signinficant Digits in Test Data to Determine Conformance with Specifications", An American National Standard, Jan. 1, 2013, Designation: E29-13, pp. 1-5.

Japanese Office Action—Japanese Application No. 2021-530079 dated Jul. 26, 2022, citing JP H11-246957, JP 2003-138364, JP 2006-193776, JP 2008-525641, JP 2009-052080, JP 2014-506626, JP 2015-036426, WO 2017-111449, KR 10-2013-0026131, and KR 10-1677390.

International Search Report—PCT/KR2019/016526 dated Mar. 9, 2020.

Chinese Office Action—Chinese Application No. 201980079329.2 dated Oct. 26, 2022, citing JP 2015-036426, JP 2009-052080, KR 10-2013-0026131, JP 2010-100866, and JP 2012-180558.

\* cited by examiner

HOT-DIP GALVANIZED STEEL SHEET HAVING EXCELLENT SURFACE APPEARANCE AND LOW-TEMPERATURE BONDING BRITTLENESS

TECHNICAL FIELD

The present disclosure relates to a hot-dip galvanized steel sheet used in home appliances, automobiles, and the like, and more particularly, to a hot-dip galvanized steel sheet having excellent surface appearance and low-temperature bonding brittleness.

BACKGROUND ART

A steel sheet used in automobiles, or the like, should have excellent resistance to external corrosive environments and have an attractive steel sheet surface. For this demand, a hot-dip galvanized steel sheet has emerged. The hot-dip galvanized steel sheet is a product in which metal zinc is plated on a steel sheet, and is a steel sheet with improved corrosion resistance through a sacrificial zinc method, and is widely used in home appliances, automobiles, or the like.

Due to the characteristics of home appliances and automobile products, there should be no foreign matter on surfaces thereof, it should have an attractive appearance, and other stains or color differences should not appear on the surfaces thereof even after painting. This characteristic is determined by grains generated during a solidification process of zinc during a plating process of the hot-dip galvanized steel sheet. Unlike grains of other metals, zinc grains tend to develop a dendritic phase when solidified, and exhibit a geometric pattern. The grains of zinc are separately called spangles, and as the spangles are larger, a boundary between the grains and (other) grains becomes clear, a dendrite structure in each grain is strongly generated, resulting in poor surface appearance.

Therefore, in order to improve the surface appearance of the plated product, it is necessary to reduce the size of the spangles. As a method for reducing the size of zinc grain, it is common to reduce the zinc grain on the surface by increasing a cooling rate of a strip immediately after plating.

In order to increase the cooling rate, there is a method of adjusting a flow amount and a flow rate of a cooler located at an upper end of an air knife immediately after plating. However, although the size of the spangles is reduced with this method, strong external force is applied to non-solidified liquid zinc, so that the thickness of the plating layer may become uneven, and may cause defects such as flow patterns.

Meanwhile, as a method for controlling the cooling rate, a method of cooling by spraying droplets containing an endothermic reaction such as phosphate (Patent Document 1). This is a method of rapidly cooling a plating layer using heat of vaporization of liquid and an endothermic reaction of phosphate to refine the grains of the plating layer. This method is effective in miniaturizing the spangles, but an operation of a liquid spraying device is complicated, and there is a disadvantage that surface defects occur when droplets are sprayed unevenly. In addition, a method of reducing the spangles of a plating layer by artificially increasing a solidification rate of the plating layer has a disadvantage that a (0001) surface of zinc is uniformly arranged on the steel sheet, resulting in deteriorating low-temperature bonding brittleness. That is, zinc has a hexagonal closet packing (HCP) structure, and has a limited slip system, and when it is tensioned on a C-axis, even twin deformation does not occurs, so it is vulnerable to tension. Moreover, depending on the temperature, activity of the destruction mechanisms of zinc metal varies, and at room temperature or higher, brittleness, grain boundary, and ductile fracture are mixed, but only brittleness (cleavage) fracturing mainly occurs at low temperatures, so that destruction by external impact may easily occur. When the zinc is uniformly arranged on the (0001) plane and parallel to the substrate, a tensile stress acts as the C-axis of the plating layer in a low-temperature bonding brittleness test, and a twin operation of zinc is difficult, so that there is a problem in which ductility of the plating layer is reduced and brittleness fracturing occurs significantly.

PRIOR ART DOCUMENT (Patent Document 1) Korean Patent Registration No. 10-0742832

DISCLOSURE

Technical Problem

An aspect of the present disclosure is to provide a hot-dip galvanized steel sheet having an attractive surface by miniaturizing zinc grain after hot-dip galvanizing is performed through surface modification of a base steel sheet of the present disclosure, and having excellent low-temperature bonding brittleness and a method of manufacturing the same.

Technical problems to be achieved in the present disclosure are not limited to the technical problems mentioned above, and other technical problems, not mentioned, will be clearly understood by those skilled in the art from the following description.

Technical Solution

According to an aspect of the present disclosure, a hot-dip galvanized steel sheet having excellent surface appearance and low-temperature bonding brittleness includes abase steel sheet; and a hot-dip galvanized layer formed on the base steel sheet, wherein a surface of the base steel sheet has a centerline average roughness (Ra) of 0.3 or more, a roughness skewness (Rsk) of −1 or less, and a roughness kurtosis (Rku) of 6 or more.

According to another aspect of the present disclosure, a method of manufacturing a hot-dip galvanized steel sheet having excellent surface appearance and low-temperature bonding brittleness includes operations of: preparing a base steel sheet; forming unevenness having a centerline average roughness (Ra) of 0.3 or more, a roughness skewness (Rsk) of −1 or less, and a roughness kurtosis (Rku) of 6 or more on a surface of the base steel sheet; and manufacturing a hot-dip galvanized steel sheet, by immersing the base steel sheet with the unevenness formed in a hot-dip galvanizing bath.

Advantageous Effects

According to the present disclosure, a hot-dip galvanized steel sheet of the present disclosure may have fine zinc grains (spangles) in the plating layer, so that an attractive surface appearance may be secured. A (0001) plane of the zinc grain is randomly oriented to have excellent low-temperature bonding brittleness.

Further, according to the present disclosure, a separate quenching process or a droplet spraying device, or the like, is not required, and a quality of the galvanized steel sheet can be improved simply and efficiently.

BEST MODE FOR INVENTION

Figure 1:
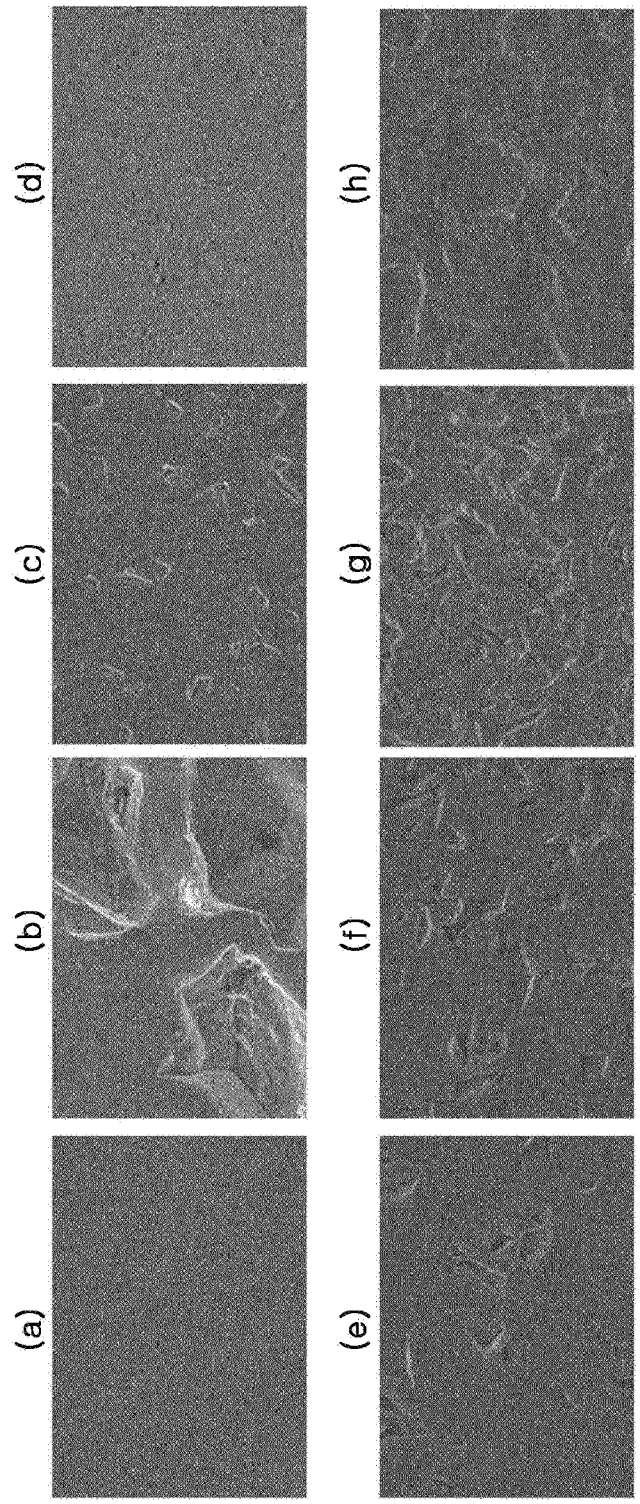
FIG. 1 is an SEM photograph of a surface of a base steel sheet of Comparative Examples and Examples disclosed in embodiments of the present disclosure.

The inventors of the present disclosure have found that in a process of manufacturing a hot-dip galvanized steel sheet, generation of nucleation of zinc changes according to a surface shape of the base steel sheet. Accordingly, it has been recognized that zinc grains (spangles) of a plating layer can be controlled through surface modification of the base steel sheet without separate control of a cooling process after hot-dip galvanizing, thereby resulting in completion of the present disclosure.

Hereinafter, the present disclosure will be described in detail. First, a hot-dip galvanized steel sheet of the present disclosure will be described in detail.

The hot-dip galvanized steel sheet of the present disclosure includes a base steel sheet and a hot-dip galvanized layer formed on the base steel sheet, and it is preferable that a surface of the base steel sheet has a centerline average roughness (Ra) of 0.3 or more, and a roughness skewness of −1 or less, and a roughness kurtosis (Rku) of 6 or more.

A method of measuring roughness may be measured according to a method prescribed by the International Organization for Standardization (ISO), and the centerline average roughness (Ra) is an arithmetic average value for the height of the surface, and can describe the roughness of the overall surface. Meanwhile, roughness skewness (Rsk) is asymmetry of a roughness curve, and if the roughness skewness (Rsk) exceeds 0, referring to a case in which there are many sharp peaks, and if it is less than 0, referring to a form in which there are many valleys. Roughness kurtosis (Rku) is a value representing sharpness of the roughness curve, and when the roughness kurtosis (Rku) is high based on 3, it means that it is sharply formed, and when it is lower than 3, it means a blunt shape.

When average roughness (Ra) of a centerline of a surface of the base steel sheet is less than 0.3, surface friction is low and slipping occurs when driving a roll, negatively affecting operating conditions such as meandering. Accordingly, in the present disclosure, an average centerline average roughness of the surface of the base steel sheet may be limited to 0.3 or more, the preferred average roughness (Ra) of the centerline may be 0.4 or more. In the present disclosure, an upper limit of the average roughness (Ra) of the centerline of the surface of the base steel sheet is not particularly limited, but it is preferable that it does not exceed 2.7 depending on operating situations.

When the roughness skewness (Rsk) of the surface of the base steel sheet exceeds −1, a region that can act as an oil pocket, is small, so frictional force during processing may increase, thereby reducing workability. Accordingly, in the present disclosure, the roughness skewness (Rsk) of the surface of the base steel sheet may be limited to −1 or less, and a preferable roughness skewness (Rsk) may be −1.5 or less. Meanwhile, in the present disclosure, a lower limit of the roughness skewness (Rsk) on the surface of the base steel sheet, but when the roughness skewness (Rsk) value is less than −5, it is difficult to expect further effects, so it is preferable that the roughness skewness (Rsk) value is −5 or more. A more preferable lower limit of the roughness skewness (Rsk) may be −4.

When roughness kurtosis (Rku) of a surface of the base steel sheet is less than 6, the surface may be formed in a blunt form, and an effect as a nucleation site for miniaturizing spangles decreases, which is not preferable. Accordingly, in the present disclosure, the roughness kurtosis (Rku) of the surface of the base steel sheet may be limited to 6 or more. A preferred roughness kurtosis (Rku) may be 7 or more. Meanwhile, in the present disclosure, an upper limit of the roughness kurtosis (Rku) may not be particularly limited, but when the roughness kurtosis (Rku) value exceeds 50, it is difficult to expect any further effects, so the roughness kurtosis (Rku) is preferably 50 or less.

In the hot-dip galvanized steel sheet of the present disclosure, the size of the zinc grains (spangles) in the plating layer is preferably 150 µm or less.

Figure 4:
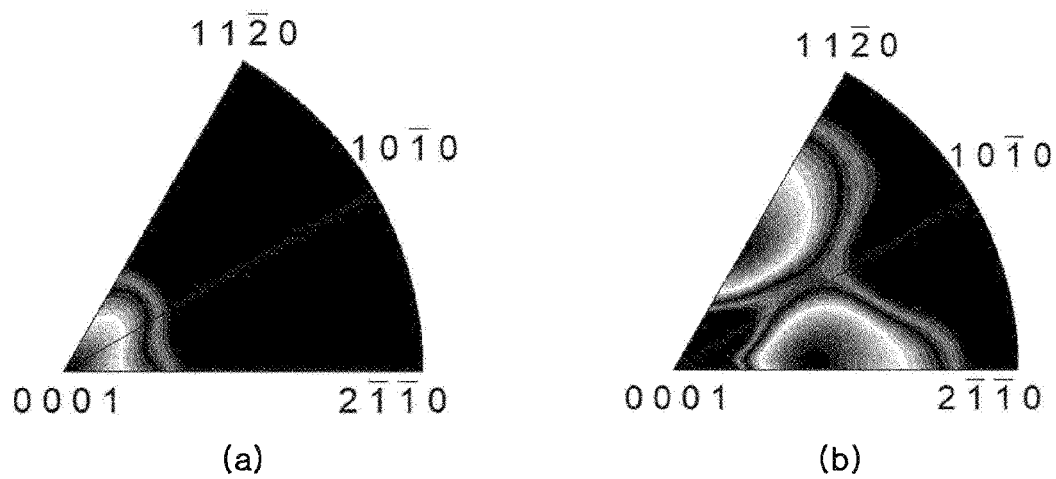
FIG. 4 is EBSD IPF map photographs of Comparative (a) Example 1 and (b) Inventive Example 1 disclosed in embodiments of the present disclosure.

The (0001) plane orientation of the zinc grains in the plating layer can be confirmed through an inverse pole figure (IPF) map analysis on the surface measured by EBSD (Electron Backscattered Diffraction). For example, it can be described through the attached (a) and (b) of FIG. 4. (a) and (b) of FIG. 4 are photographs of EBSD IPF maps of Comparative Example 1 and Inventive Example 1 of Embodiments to be described later, respectively. As shown in (a) of FIG. 4, in Comparative Example 1, spangles are concentrated on the (0001) plane, but in Inventive Example 1 shown in (b), it can be confirmed that spangles are evenly distributed on the other side other than the (0001) plane.

When a crack location where brittleness fracturing of the plating layer occurs at low temperatures is observed, it is known that destruction of the plating layer occurs at a grain boundary of the plating layer or at an interface between base iron and the plating layer. The reason for which fracturing begins at the grain boundary or interface is that when zinc solidifies, solidification shrinkage may occur, resulting in a volume difference (about 8.3%), and thus voids may occur at the grain boundary after hot-dip plating. In this case, since a coefficient of thermal expansion in a C-axis direction is about 5 times larger than in an A-axis direction, a probability of occurrence of a misfit between the base iron and the plating layer increases as it is arranged on the (0001) plane. In addition, as preferred orientation is accumulated on the (0001) plane, a bulk modulus and a Young's modulus increase, and relatively high stress is applied to the interface between the plating layer and the base iron or the grain boundary accumulated on the (0001) plane, such that fracturing is likely to occur. Therefore, the smaller the spangles and the random orientation of the (0001) plane, the better the resistance to low-temperature bonding brittleness becomes, and the surface looks attractive.

Meanwhile, the type of the base steel sheet is not particularly limited, and a steel sheet to which hot-dip galvanization can be applied in the technical field to which the present disclosure belongs is sufficient. That is, the type or shape of the base steel sheet of the present disclosure is not particularly limited, such as mild steel, high-strength steel, a hot-rolled steel sheet, a cold-rolled steel sheet, a wire rod, and the like.

Next, an example of manufacturing the hot-dip galvanized steel sheet according to the present disclosure will be described in detail.

In order to manufacture the hot-dip galvanized steel sheet of the present disclosure, a base steel sheet is prepared, and unevenness is formed on a surface of the base steel sheet. Thereafter, it is preferable to perform plating by immersing the base steel sheet on which the unevenness is formed in a hot-dip galvanizing bath. The unevenness is formed on the surface of the base steel sheet such that average roughness (Ra) is 0.3 or more, roughness skewness (Rsk) is −1 or less, and roughness kurtosis (Rku) is 6 or more. A method of forming the unevenness is not particularly limited, but as the method of forming the unevenness, there are methods of a method of directly forming the unevenness on the surface of the base steel sheet, a method of preparing a roll in which the unevenness of the above conditions are formed, and passing the base steel sheet between the rolls to transfer the roughness formed on the surface of the roll to the surface of the steel sheet, and the like. As a technology for manufacturing the roll in which the irregularities are formed therein, there may be a method of attaching a separate material having the unevenness formed on a surface of the roll, and there may be a method of directly forming unevenness on the surface of the roll. As the method of directly forming the unevenness on the surface of the roll, methods such as Shot Blasting Texturing (SBT), Laser Beam Texturing (LBT), Electrical Discharging Texturing (EDT), Electron Beam Texturing (EBT) may be used.

SBT is a method of physically forming unevenness on the surface of the roll by spraying a fine grit, or the like, on the surface of the roll, and LBT or EBT is a method of forming unevenness on the surface of the roll by irradiating a laser beam or an electron beam. Meanwhile, EDT is called electric discharge processing, and is a method of forming a high voltage potential between the roll and an external electrode to form unevenness due to electric sparks on the surface of the roll.

A hot-dip galvanizing layer is formed on a surface of the base steel sheet on which the unevenness is formed as described above. As a method of forming the hot-dip galvanizing layer, a method of immersing the base steel sheet in a hot-dip galvanizing bath, and then adjusting an amount of plating and solidifying it, is preferable.

First, the base steel sheet on which the unevenness is formed may be subject to an annealing heat treatment process for controlling a material of the steel sheet and removing oxides on the surface thereof. The annealing heat treatment is maintained at 750 to 950° C. for 30 to 180 seconds in a nitrogen atmosphere containing 5 to 40% by volume of hydrogen, and then cooled to 450 to 550° C.

Thereafter, the base steel sheet is immersed in a galvanizing bath, passing through a sink roll, and coming out of the galvanizing bath. In this case, liquid zinc on the surface of the base steel sheet is adjusted to a fixed adhesion amount by a flow amount and a flow rate of gas sprayed from an air knife, and is cooled to 300° C. or less through a cooler installed at an upper end of the air knife. The plated steel sheet manufactured through the plating process may have fine spangles and secure random orientation.

MODE FOR INVENTION

Hereinafter, the present disclosure will be described in more detail through examples. However, it is necessary to note that the following examples are only intended to illustrate the present disclosure in more detail and are not intended to limit the scope of the present disclosure. This is because the scope of the present disclosure is determined by matters described in the claims and able to be reasonably inferred therefrom.

Example

Low-carbon mild steel having a tensile strength of 300 MPa or less was prepared as a base steel sheet, and mirror polishing was performed so that there was no unevenness on a surface thereof for comparison of the surface conditions.

After the polishing was performed, surface irregularities were formed on the surface of the steel sheet so as to be Rsk, Rku, and Ra shown in Table 1 below to prepare a steel sheet. Surface modification of the steel sheet was performed by attaching a sandpaper between rolls and passing the steel sheet through the rolls.

FIG. 1 below is a view of the surface of the steel sheet after performing the surface modification with a scanning electron microscope (SEM). (h) of FIG. 1 is Comparative example 5 below, which shows a surface of a general steel sheet before the mirror polishing is performed. (a), (b), (c), and (d) of FIG. 1 are surface modified under the conditions of Comparative Examples 1 to 4 in Table 1, respectively, and (e), (f), and (g) are surface modified under the conditions of Inventive Examples 1 to 3, respectively.

TABLE 1

| Classification | Roughness of base steel sheet | | | Characteristic of plating layer | | Low-temperature bonding brittleness |
|---|---|---|---|---|---|---|
| | Rsk | Rku | Ra | Size of (0001) spangle | Orientation | |
| CE 1 | 0.43 | 2.68 | 0.09 | 928 | Very strong | Peeling |
| CE 2 | −1.51 | 5.89 | 6.75 | 192 | Strong | Peeling |
| CE 3 | −1.04 | 25.76 | 0.24 | 191 | Intermediate | Partial peeling |
| CE 4 | −0.07 | 5.69 | 0.14 | 251 | weak | Partial peeling |
| IE 1 | −4.07 | 29.03 | 0.42 | 142 | Random | Non-peeling |
| IE 2 | −2.4 | 13.57 | 0.84 | 96 | Random | Non-peeling |
| IE 3 | −1.52 | 7.18 | 1.05 | 84 | Random | Non-peeling |
| CE 5 | −0.15 | 1.95 | 1.25 | 293 | strong | Peeling |

Hot-dip galvanizing was performed on a base steel sheet having roughness of Table 1. In this case, the hot-dip galvanizing was performed by immersing in a Zn plating bath containing 0.1 to 0.3 wt % of Al at a plating bath temperature of 440 to 480° C., and then by adjusting a plating amount to 160 g/m² through an air knife, and by cooling it at a cooling rate of 7° C./s, such that a hot-dip galvanized steel sheet was prepared.

A characteristic of a plating layer of the hot-dip galvanized steel sheet thus prepared were observed, and result thereof were shown together in Table 1 above. In the Table 1, a spangle size was measured through an optical microscope SEM. Meanwhile, an (0001) plane orientation was analyzed using EBSD (Electro Backscattered Diffraction).

(a) to (h) of FIG. 2 below are optical micrographs observing the surfaces of the plating layers of Comparative Examples 1 to 4, Inventive Examples 1 to 3, and Comparative Example 5, respectively.

Figure 3:
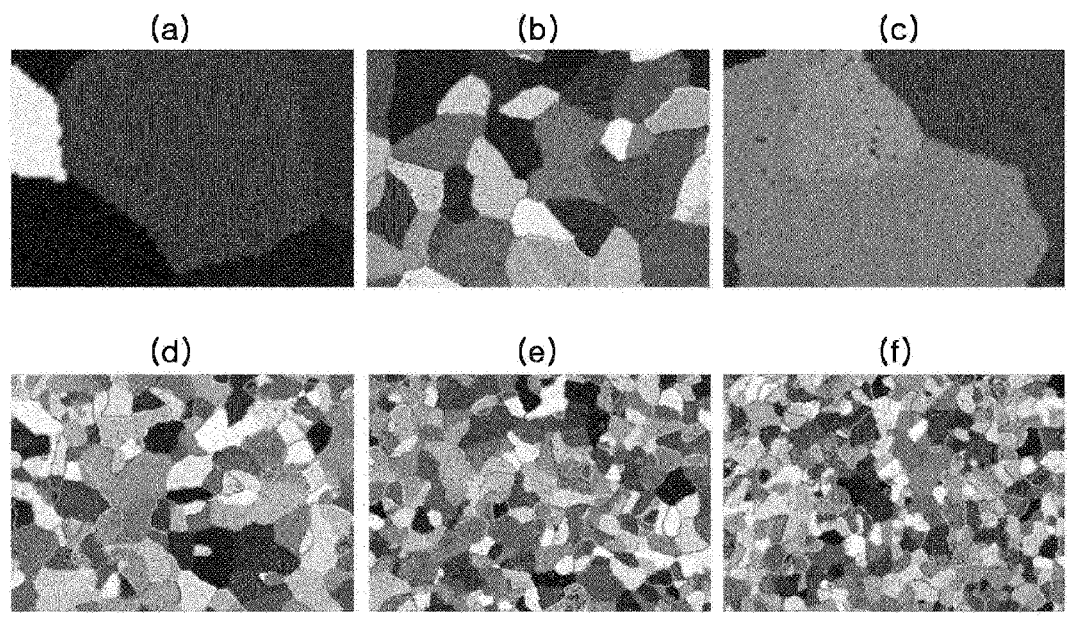
FIG. 3 is an EBSD (Electron Backscattered Diffraction) photograph of Comparative Examples and Examples disclosed in embodiments of the present disclosure.

(a) to (f) of FIG. 3 are photographs obtained by measuring the surface of the plating layer with EBSD to confirm the orientation of Comparative Examples 1 to 3 and Inventive Examples 1 to 3, respectively, and a region having different shades on a photograph means a region having different plane orientations. In (a) to (f) of FIG. 3, a relatively dark area means a (0001) plane, and results thereof were shown in the table 1 after observing the (0001) plane orientation based thereon. (a) and (b) of FIG. 4 show EBSD IPF map results observing the (0001) plane orientation of Comparative Example 1 and Inventive Example 1, respectively.

In the Table 1, low-temperature bonding brittleness was evaluated using an Impact Peel Test. Specifically, after attaching the two specimens with an adhesive, and after forcibly removing the specimen by impact of the steel sheet under a condition of −45° C., if peeling occurs in the adhesive, it can be evaluated as "non-peeling", and if peeling occurs at the interface between the plating layer and base iron, it was evaluated as "peeling" or "partial peeling"

Figure 2:
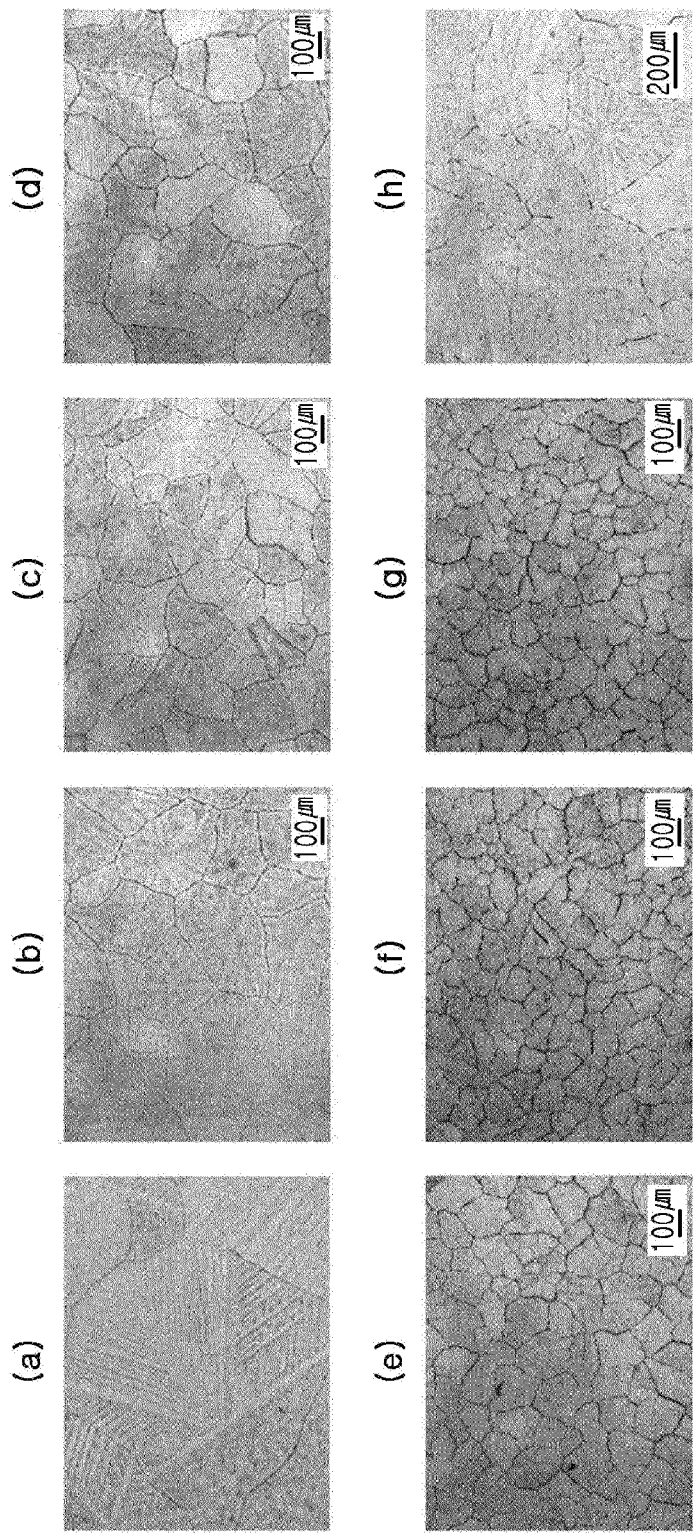
FIG. 2 is an SEM photograph of a surface of a plating layer after the base steel sheet of FIG. 1 is subject to hot-dip galvanizing.

As can be seen from the results of Table 1 and FIGS. 2 to 4, in Inventive Examples 1 to 3 satisfying the conditions presented in the present disclosure, the size of the sequins are all formed to be 150 μm or less, so that the surface is beautiful, and shows various orientations, so that it can be seen that low-temperature bonding brittleness is excellent.

In comparison thereto, in Comparative Examples 1 to 5, the roughness of the surface of the base steel sheet was out of the scope of the present disclosure, so that it can be confirmed that the size of the zinc grains was very coarse, and the orientation of the (0001) plane was strong, and it can be seen that the surface appearance and low-temperature bonding brittleness is poor.

The invention claimed is:

1. A hot-dip galvanized steel sheet having excellent surface appearance and low-temperature bonding brittleness, comprising:
   a base steel sheet; and
   a hot-dip galvanized layer formed on a surface of the base steel sheet,
   wherein the surface of the base steel sheet has unevenness including a centerline average roughness (Ra) of 0.3 μm or more, a roughness skewness (Rsk) of −1 or less, and a roughness kurtosis (Rku) of 6 or more.

2. The hot-dip galvanized steel sheet of claim 1, wherein a zinc grain (spangle) size of the hot-dip galvanized layer is 150 μm or less.

3. A method of manufacturing a hot-dip galvanized steel sheet having excellent surface appearance and low-temperature bonding brittleness, comprising operations of:
   preparing a base steel sheet;
   forming unevenness on a surface of the base steel sheet, the unevenness having a centerline average roughness (Ra) of 0.3 μm or more, a roughness skewness (Rsk) of −1 or less, and a roughness kurtosis (Rku) of 6 or more; and
   forming a hot-dip galvanized layer by immersing the base steel sheet with the unevenness in a hot-dip galvanizing bath.

4. The method of claim 3, wherein the forming of the unevenness includes: passing the base steel sheet between rolls on which unevenness is formed.

5. The method of claim 4, wherein the unevenness formed on the rolls is formed by any one of SBT (Shot Blasting Texturing), LBT (Laser Beam Texturing), EDT (Electrical Discharging Texturing), and EBT (Electron Beam Texturing).

6. The method of claim 3, further comprising: performing annealing heat-treatment of the base steel sheet for 30 to 180 seconds at 750 to 950° C. in a nitrogen atmosphere containing 5 to 40 vol% of hydrogen, before the immersing.

* * * * *